(12) United States Patent
Yamada et al.

(10) Patent No.: US 8,281,574 B2
(45) Date of Patent: Oct. 9, 2012

(54) EXHAUST-GAS PROCESSING DEVICE FOR A DIESEL ENGINE

(75) Inventors: Shuichi Yamada, Sakai (JP); Katsushi Inoue, Sakai (JP); Yuuki Ishii, Sakai (JP)

(73) Assignee: Kubota Corporation, Osaka (JP)

( * ) Notice: Subject to any disclaimer, the term of this patent is extended or adjusted under 35 U.S.C. 154(b) by 254 days.

(21) Appl. No.: 12/717,622

(22) Filed: Mar. 4, 2010

(65) Prior Publication Data

US 2011/0023468 A1    Feb. 3, 2011

(30) Foreign Application Priority Data

Aug. 3, 2009  (JP) .................................. 2009-180362

(51) Int. Cl.
*F01N 3/00*    (2006.01)
(52) U.S. Cl. ................. 60/296; 60/286; 60/287; 60/303
(58) Field of Classification Search ....................... 60/295
See application file for complete search history.

(56) References Cited

U.S. PATENT DOCUMENTS

| | | | | |
|---|---|---|---|---|
| 4,719,751 A * | 1/1988 | Kume et al. | ..................... | 60/285 |
| 4,835,964 A * | 6/1989 | Kume et al. | ..................... | 60/285 |
| 2008/0235644 A1 * | 9/2008 | Nishimuda | ..................... | 716/10 |
| 2008/0276604 A1 * | 11/2008 | Hosaka | ..................... | 60/295 |
| 2009/0025372 A1 * | 1/2009 | Onodera et al. | ................ | 60/286 |
| 2009/0064665 A1 | 3/2009 | Iizuka et al. | | |

FOREIGN PATENT DOCUMENTS

| | | |
|---|---|---|
| DE | 10316810 A1 | 11/2004 |
| EP | 1882829 A1 | 1/2008 |
| JP | 03-202612 A | 9/1991 |
| JP | 2003-184536 A | 7/2003 |
| JP | 2005-113752 A | 4/2005 |
| JP | 2005-171972 A | 6/2005 |
| JP | 2005299403 A * | 10/2005 |
| JP | 2007120325 A * | 5/2007 |
| JP | 2008-202573 A | 9/2008 |

OTHER PUBLICATIONS

EP Search Report issued on Nov. 5, 2010 in EP Application No. EP 10 25 0392.7.

* cited by examiner

*Primary Examiner* — Thomas Denion
*Assistant Examiner* — Jason Shanske
(74) *Attorney, Agent, or Firm* — Panitch Schwarze Belisario & Nadel LLP

(57) ABSTRACT

The present invention has an object to provide an exhaust-gas processing device for a diesel engine, able to inhibit the deterioration of the fuel-consumption and the output reduction.
In order to accomplish the above object, the device is provided with a DPF, a means for presuming the amount of PM to be deposited on the DPF, a DPF-regeneration means, a DPF-regeneration control means, a storing means, a means for sending message to demand an accelerated regeneration, and an operation means for starting the accelerated regeneration. While a normal regeneration processing is being continued (S6) since it has started (S2), the time when a term (T1) for reserving judgment as to the demand for accelerated regeneration has elapsed is taken as the judging time (T3). At this judging time (T3), if the assumed value of the PM deposed amount exceeds a value (J2) for judgment as to the demand for accelerated regeneration, the accelerated regeneration is deemed to be demanded. Then the DPF-regeneration control means allows the means for sending message to demand the accelerated regeneration to start (S8) sending the message to demand the accelerated regeneration.

7 Claims, 5 Drawing Sheets

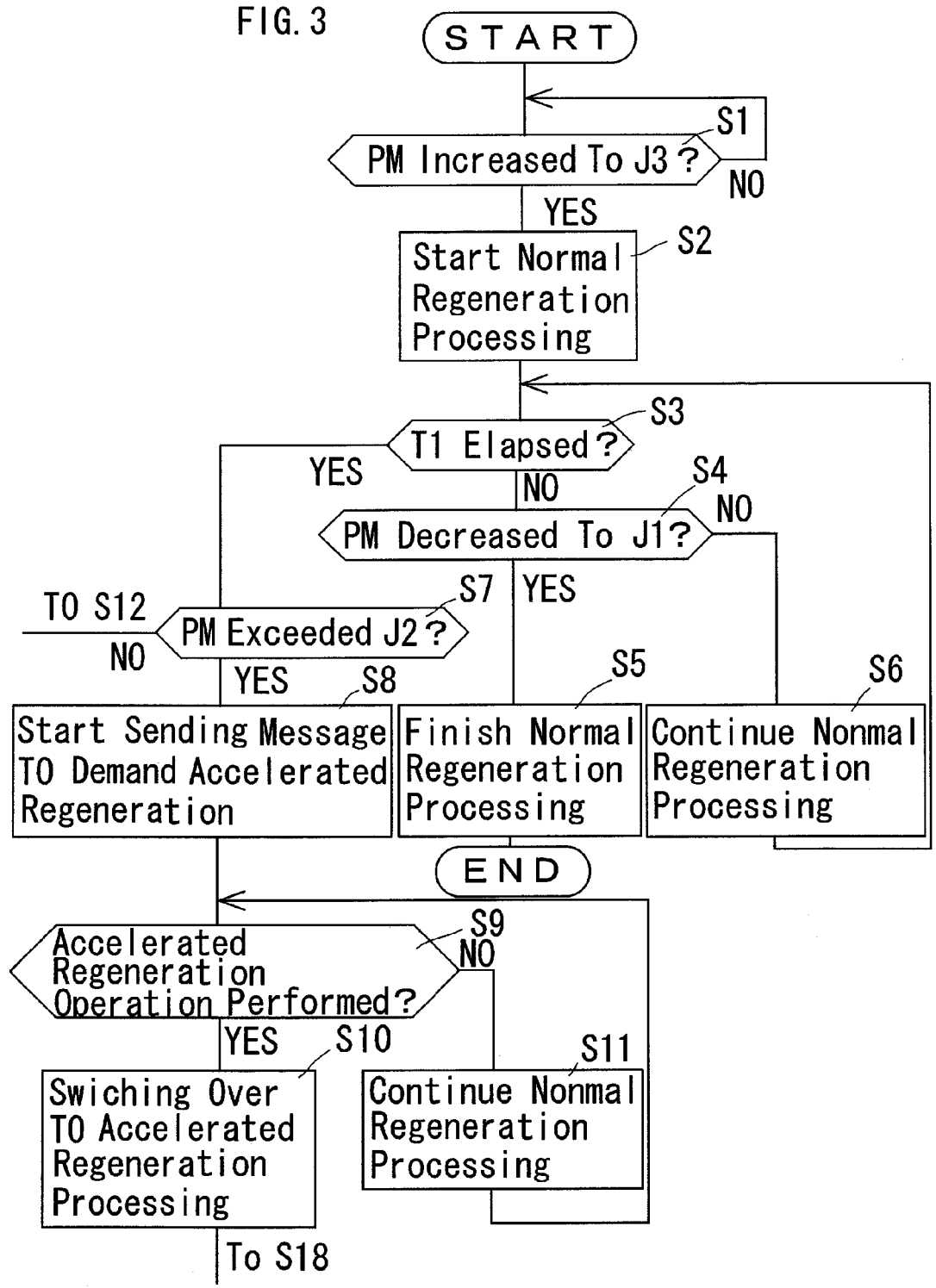

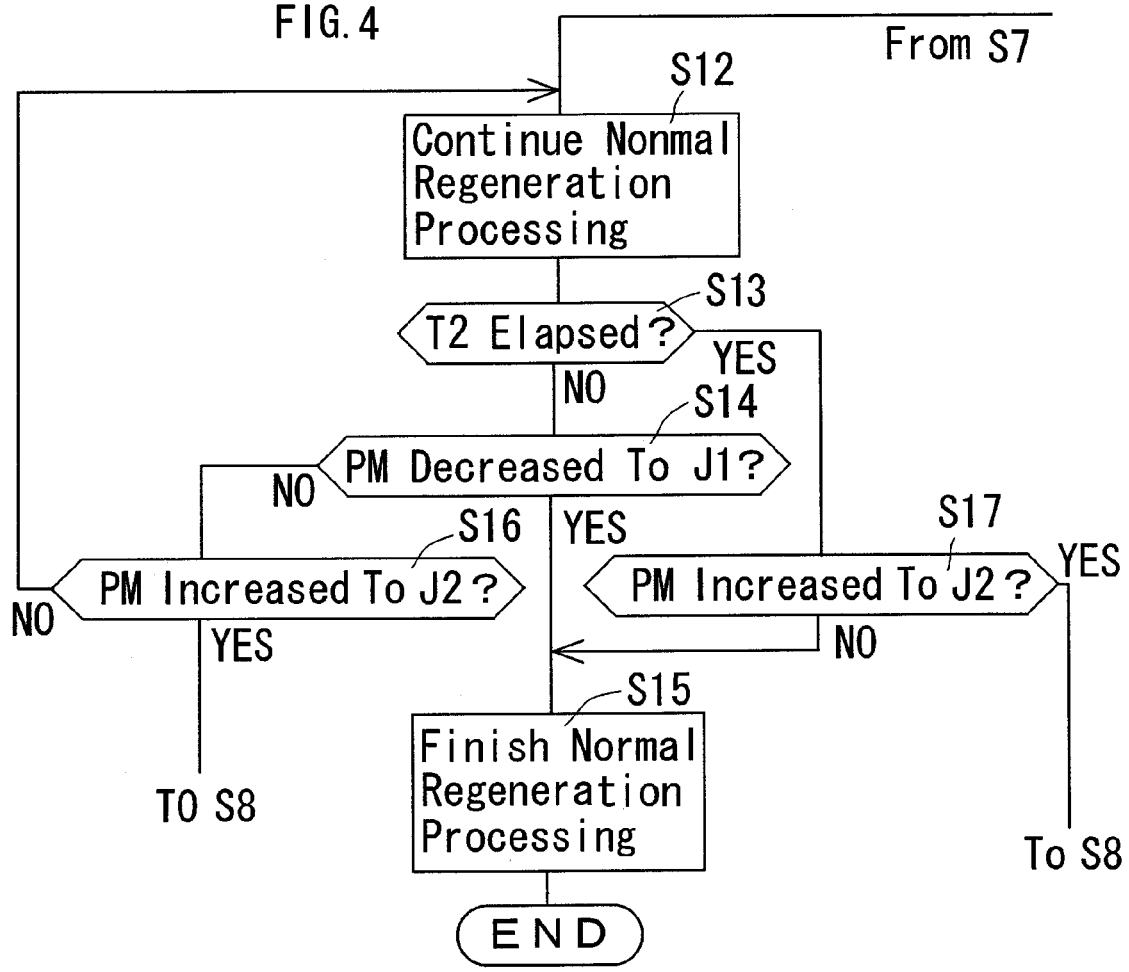

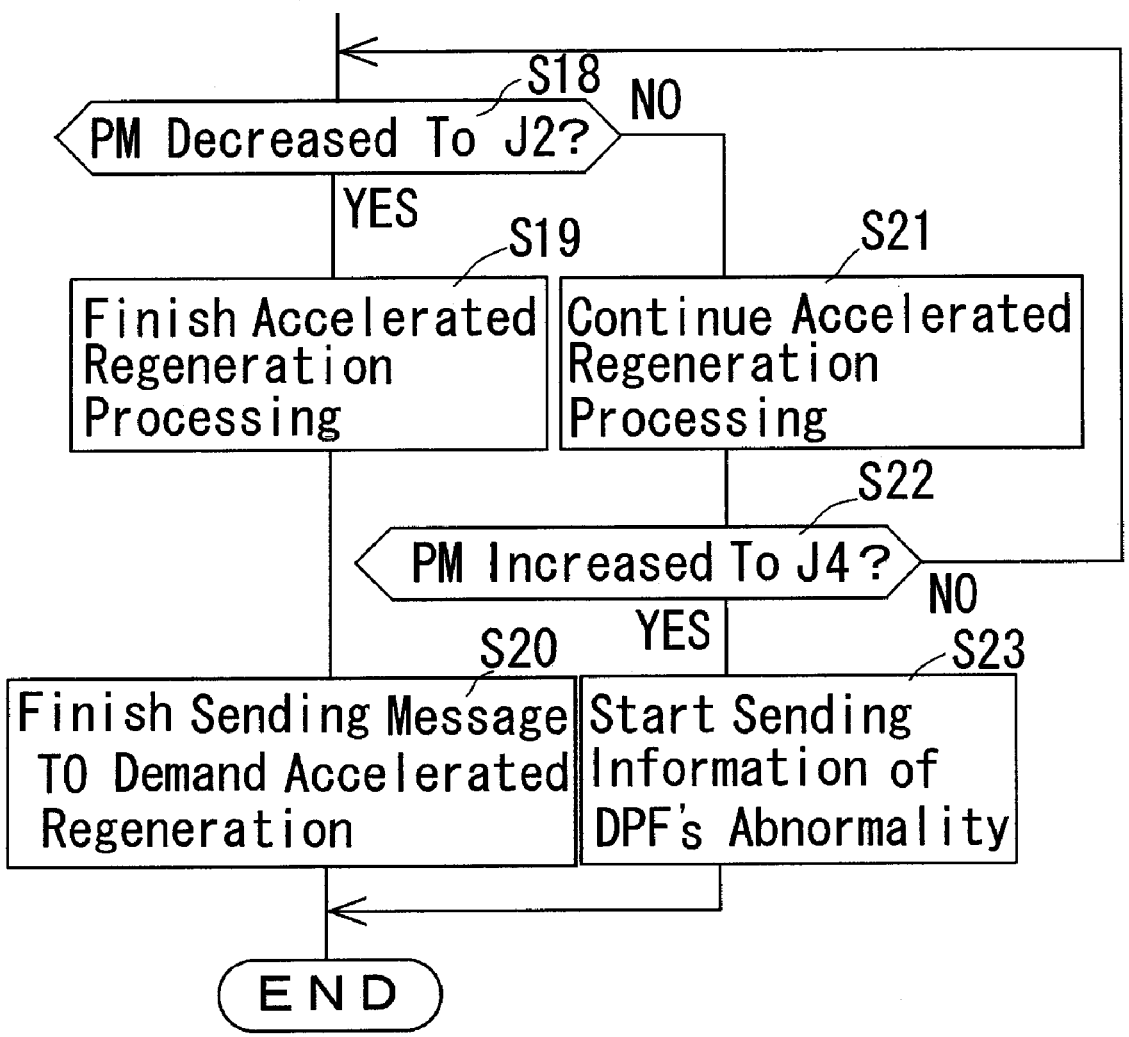

EXHAUST-GAS PROCESSING DEVICE FOR A DIESEL ENGINE

TECHNICAL FIELD

The present invention concerns an exhaust-gas processing device for a diesel engine and more particularly relates to an exhaust-gas processing device for a diesel engine, able to inhibit the deterioration of the fuel-consumption and the output reduction.

In the specification and claims, the terms 'DPF', 'PM' and 'DOC' mean 'diesel-particulate-filter', 'particular matter in the exhaust gas' and 'oxidation catalyst', respectively.

BACKGROUND ART

A conventional example of the exhaust-gas processing device for the diesel engine comprises a DPF, a PM deposited-amount detecting means, a forced-regeneration means, a forced-regeneration control means and a forced-regeneration alarming means (for example, see FIGS. 1 and 2).

According to the above conventional technique, the DPF captures the PM in the exhaust gas. And when the device comes to a first state where the detected value of the PM deposited amount reaches a first set value, while the vehicle is running, a running-forced-regeneration for activating the forced-regeneration means is automatically initiated to burn the PM for removing it. Further, if the device comes to a second state because the PM cannot be burnt for removal by the running-forced-regeneration and therefore the detected value of the PM deposited amount increases as much as it reaches a second set value higher than the first one, the forced-regeneration alarming means is activated to warn it is necessary to perform a stopping-forced-regeneration for recovering the forced-regeneration means when the vehicle stops.

However, this conventional technique cannot warn the necessity of performing the stopping-forced-regeneration unless the detected value of the PM deposited amount reaches the second set value higher than the first one after the detected value of the PM deposited amount has reached the first set value and then the running-forced-regeneration has been initiated. Thus this causes a problem.

PRIOR ART LITERATURE

[Patent Literature]
[Patent Literature 1] Patent Application Laid-Open No. 2005-113752

OUTLINE OF THE INVENTION

Problem the Invention Attempts to Solve

<Problem> There is a probability of deteriorating the fuel-consumption as well as reducing the output.

After the detected value of the PM deposited-amount has arrived at the first set value and then the running-forced-regeneration has been initiated, in the case where the speed at which the PM is burnt for removal competes with that at which the PM deposits and as a result the detected value of the PM deposited-amount stays for a long period of time in the vicinity of the first one, it is likely to invite an undesirable situation where the necessity of performing the stopping-forced-regeneration is not warned, thereby allowing the running-forced-regeneration to continue for a long time with the result of causing the deterioration of the fuel-consumption and the output reduction.

The present invention has an object to provide an exhaust-gas processing device for a diesel engine, capable of inhibiting the deterioration of the fuel-consumption and the output reduction.

Means for Solving the Problem

The inventive featuring matters of the invention are as follows.

As exemplified in FIG. 1, an exhaust-gas processing device for a diesel engine comprises a DPF 1, a means 2 for presuming the amount of the PM to be deposited on the DPF 1, a DPF-regeneration means 3, a DPF-regeneration control means 4, a storing means 5, a means 6 for sending message to demand an accelerated regeneration, and an operation means 7 for starting the accelerated regeneration. In this device, As exemplified in FIG. 2, the storing means 5 stores a plurality of judging values (J2), (J3) and a term (T1) for reserving the judgment as to the demand for accelerated regeneration;

The plurality of judging values (J2), (J3) comprises a value (J2) for judgment as to the demand for accelerated regeneration and a value (J3) for judgment as to starting the normal regeneration, higher than the judging value (J2);

The DPF-regeneration control means 4 compares the value of the PM deposited amount assumed by the means 2 for presuming the PM deposited amount, with the plural judging values (J2), (J3);

When the assumed value of the PM deposited amount increase to the value (J3) for judgment as to starting the normal regeneration, the DPF-regeneration control means 4 automatically enables the DPF-regeneration means 3 to start the normal regeneration processing (S2) so as to increase the temperature of the exhaust gas to be passed through the DPF 1;

While the normal regeneration processing is being continued (S6) since it has started (S2), the time when the term (T1) for reserving judgment as to the demand for accelerated regeneration has elapsed is regarded as the time (T3) for judgment as to the demand for accelerated regeneration. At this judging time (T3) for demanding the accelerated regeneration, in the event that the assumed value of the PM deposited amount exceeds the judging value (J2) for demanding the accelerated regeneration, the accelerated regeneration is deemed to be demanded and the DPF-regeneration control means 4 allows the means 6 for sending message to demand the accelerated regeneration to start sending the message to demand the accelerated regeneration (S8); and When the accelerated-regeneration starting operation has been performed by the accelerated-regeneration starting operation means 7, the DPF-regeneration control means 4 switches the normal regeneration processing by the DPF-regeneration means 3 over to the accelerated regeneration processing (S10) to increase the temperature of the exhaust gas to be passed through the DPF 1 so as to accelerate the regeneration speed of the DPF 1 more than the case of the normal regeneration processing.

Effect of the Invention

The invention as defined herein offers the following effect.
<Effect> It is possible to inhibit the deterioration of the fuel-consumption and the output reduction.

As shown in FIG. 2 for example only, after the assumed value of the PM deposited-amount has increased to the judging value (J3) as to starting the normal regeneration and then the DPF-regeneration control means 4 has automatically started the normal regeneration processing (S2), even if the speed at which the PM is burnt for removal competes with that at which the PM deposits and as a result the assumed value of the PM deposited amount stays in the vicinity of the value (J3) for judgment as to starting the normal regeneration, the message for demanding the accelerated regeneration is initiated to be sent at the time (T3) for judgment as to the demand for accelerated regeneration (S8). Thus the normal regeneration processing can be promptly switched over to the accelerated regeneration processing (S10) to result in the possibility of inhibiting the deterioration of the fuel-consumption and the output reduction attributable to the elongated normal regeneration processing.

In addition to the effect of the invention described above, the invention also offers the following effect.

<Effect> It is possible to inhibit the normal regeneration processing from continuing for a longer period of time after the term for reserving the judgment as to the demand for accelerated regeneration has elapsed.

As exemplified in FIG. 2, during a term for re-judgment (T2) as to the demand for accelerated regeneration, the DPF-regeneration control means 4 executes either finishing the normal regeneration processing (S15) or initiating to send the message to demand the accelerated regeneration (S8). Thus after the term (T1) for reserving judgment as to the demand for accelerated regeneration has elapsed, the normal regeneration processing can be inhibited from being continued during a longer term.

In addition to the effect of the invention as described above, the invention also offers the following effect.

<Effect> The accelerated regeneration processing can be inhibited from being continued for a longer period of time.

As exemplified in FIG. 2, in the case where the assumed value of the PM deposited amount has decreased to the value (J2) for judgment as to the demand for accelerated regeneration that is a lower limit value of the demand for accelerated regeneration, the DPF-regeneration control means 4 allows the accelerated regeneration processing to finish (S19). Thus the accelerated regeneration processing can be inhibited from continuing for a longer period of time.

In this case, even if the accelerated regeneration processing has finished, since the assumed value of the PM deposited amount has decreased to the lower limit value of the accelerated-regeneration demand, the DPF 1 comes to be free from clogging to a considerable degree and the output reduction caused by the increase of the back pressure is inhibited to a certain degree. Therefore, the engine operation should not fall in disorder after the accelerated regeneration processing has been completed.

In addition to the effect of the invention as described above, the invention also offers the following effect.

<Effect> It is possible to call the people's attention to the execution of the emergency measures.

As exemplified in FIG. 2, when the assumed value of the PM deposited amount increases to a value (J4) for judgment as regards abnormality of the DPF 1, a means 8 for sending information about the abnormality of the DPF enables the DPF-regeneration control means 4 to initiate sending the information about the abnormality of the DPF (S23). Thus should abnormal PM deposition have occurred, it is possible to call the people's attention to the necessity of taking the emergency measures such as stopping the engine, cleaning of the DPF in the maintenance factory or the like.

In addition to the effect of the invention as described above, the invention also offers the following effect.

<Effect> The normal regeneration processing can be inhibited from continuing for a longer period of time.

As exemplified in FIG. 2, when the normal regeneration processing has decreased the assumed value of the PM deposited amount to the value (J1) for judgment as to finishing the normal regeneration, the DPF-regeneration control means 4 completes the normal regeneration processing (S5), (S15), so that the normal regeneration processing can be prohibited from continuing for a longer time.

In addition to the effect of the invention as described above, the invention also offers the following effect.

<Effect> There is no likelihood that the accelerated regeneration processing brings the engine-loaded machine into disorder while it is running or working.

The normal regeneration processing is executed simultaneously while at least either of the running and the working of the engine-loaded machine is being performed. And the accelerated regeneration processing is effected during the interruption of both of the running and the working of the engine-loaded machine. Thus the accelerated regeneration processing is unlikely to bring the running or the working of the engine-loaded machine into disorder.

In addition to the effect of the invention as described above, the invention also offers the following effect.

<Effect> A common-rail system is combined with a DOC, thereby enabling the DPF regeneration to be performed.

As shown in FIG. 1, the common-rail system 9 is combined with the DOC 10, thereby enabling the regeneration of the DPF 1.

BRIEF DESCRIPTION OF THE DRAWINGS

[FIG. 3] is a part of a flow chart showing the regeneration processing by the exhaust-gas processing device for the diesel engine according to the embodiment of the present invention;

[FIG. 4] shows a part in continuity with Step (S7) of the flow chart shown in FIG. 3; and

[FIG. 5] shows a part in continuity with Step (S10) of the flow chart shown in FIG. 3.

MOST PREFERRED EMBODIMENT OF THE INVENTION

FIG. 1 to FIG. 5 show an exhaust-gas processing device for a diesel engine according to an embodiment of the present invention. In this embodiment, an explanation is given for an exhaust-gas processing device for a multi-cylinder diesel engine.

Figure 1:
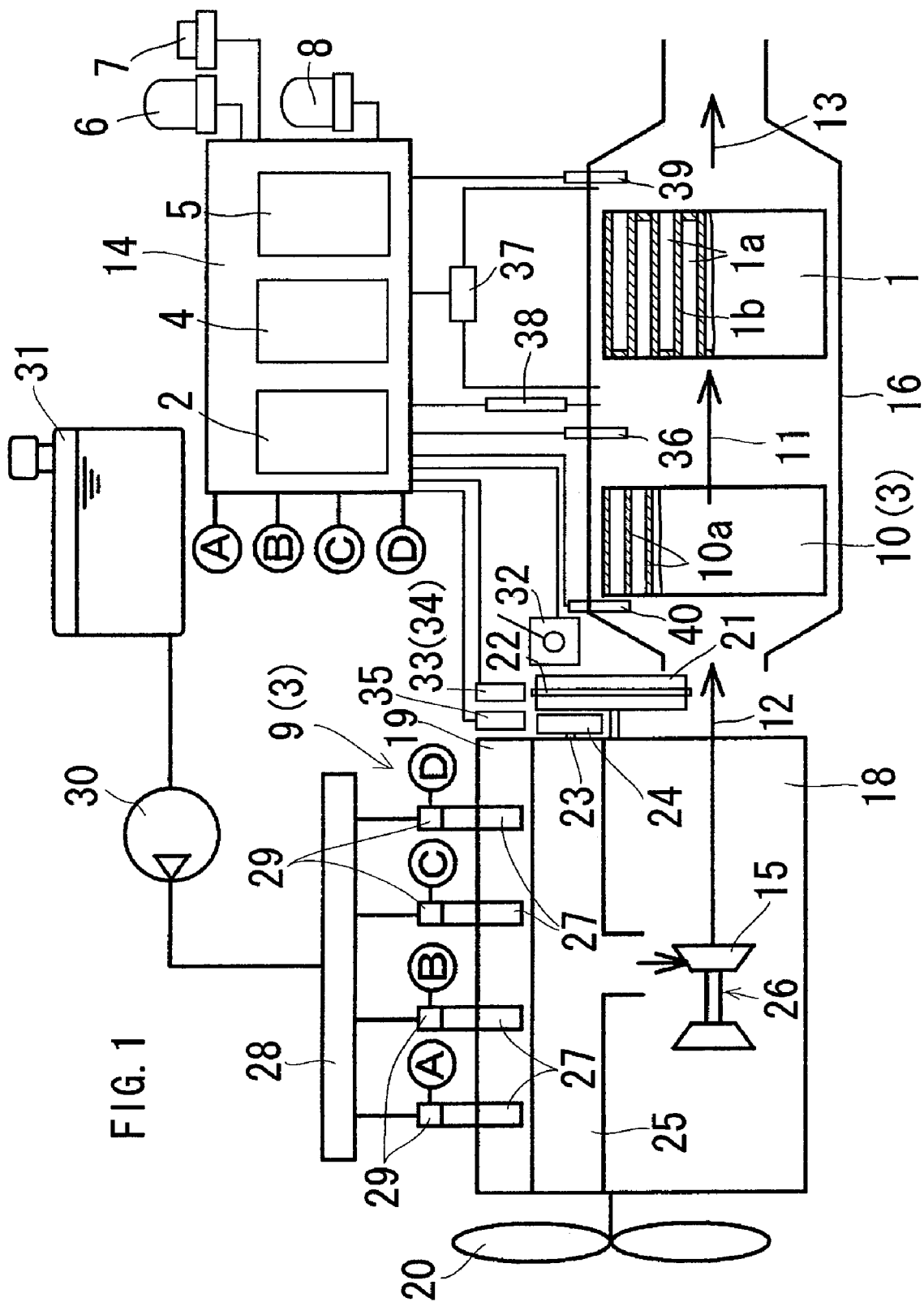
[FIG. 1] shows a schematic view of an exhaust-gas processing device for a diesel engine according to an embodiment of the present invention.

The diesel engine shown in FIG. 1 is outlined as follows.

A cylinder block 18 has an upper portion to which a cylinder head 19 is assembled and has a front portion where an engine-cooling fan 20 is arranged. The cylinder block 18 has a rear portion at which a fly-wheel 21 is disposed. A rotor plate 22 is attached to the fly-wheel 21. Further, a sensor plate 24 attached to a valve-operating cam-shaft is arranged at the rear portion of the cylinder block 18. The cylinder head 19 has one side on which an exhaust manifold 25 is arranged, and the exhaust manifold 25 is communicated with a supercharger 26. A DPF case 16 housing a DPF 1 is disposed downstream of a turbine 15 of the supercharge 26. The DPF case 16 also houses a DOC 10. In the cylinder head 19, an injector 27 is arranged for every cylinder and is connected to a common rail 28. Each of the injectors 27 is provided with an electromagnetic valve 29. A common rail 28 is connected to a fuel reservoir 31 through a fuel-supply pump 30.

A target engine-rotation number setting means 32, an actual engine-rotation number detecting means 33, a crank-angle detecting means 34 and a cylinder-judging means 35 are associated with the electromagnetic valve 29 of the injector 27 through a control means 14. The target engine-rotation number setting means 32 is a potentiometer that outputs the target engine-rotation number from a position for setting a speed-control lever as a voltage value. Each of the actual engine-rotation number detecting means 33 and the crank-angle detecting means 34 comprises a pick-up coil disposed opposite to an outer periphery of the rotor plate 22. The pick-up coil detects the number of many tooth provided in the outer periphery of the rotor plate 22 at a predetermined spacing so as to detect the actual number of the engine's rotations and the crank angle. The cylinder-judging means 35 is a sensor that detects the projection provided on the sensor plate 24 to thereby judge in which step the combustion cycle of every cylinder exists. The control means 14 is an engine's ECU. The ECU is an abbreviation of the 'Electronic Control Unit'.

The control means 14 controls the valve-opening timing of the electromagnetic valve 29 of the injector 27 and the period of time during which that valve 29 continues to be open so as to reduce a difference between the target engine-rotation number and the actual engine-rotation number, thereby allowing the injector 27 to inject a predetermined amount of fuel to a combustion chamber at a predetermined timing.

The exhaust-gas processing device is constituted as follows.

As shown in FIG. 1, it comprises a DPF 1, a means 2 for presuming the amount of the PM to be deposited on the DPF 1, a DPF-regeneration means 3, a DPF-regeneration control means 4, a storing means 5, a means 6 for sending message to demand an accelerated regeneration, and an operation means 7 for starting the accelerated regeneration.

The DPF 1 is a wall-flow monolith adjacent cells 1a of which have end portions with their openings alternatively sealed by a ceramic honey-comb substrate. The cell 1a has an interior area and a wall 1b through which the exhaust gas passes and the PM is captured by the wall 1b of the cell 1a.

The means 2 for presuming the PM deposited amount is a predetermined calculation part of the engine's ECU which is the control means 14. It presumes the PM deposited amount from a map data experimentally sought in advance, based on the engine's load, the engine-rotation number, the exhaust-gas temperature detected by an exhaust-temperature sensor 36 on the DOC's upstream side, the exhaust-gas pressure on the DPF's upstream side detected by a DPF's upstream-side exhaust-gas pressure sensor 38, and the differential pressure between the upstream side and the downstream side of the DPF 1 detected by a differential-pressure sensor 37 and the like.

The DPF-regeneration means 3 comprises a combination of a common-rail system 9 and a DOC 10 arranged upstream of the DPF 1. The normal regeneration processing and the accelerated regeneration processing incorporates un-burnt fuel into the exhaust gas by a post-injection performed through the injector 27 of the common-rail system 9 after a main-injection and the un-burnt fuel makes oxidation-combustion with the oxygen in the exhaust gas by the DOC 10 so as to increase the temperature of the exhaust gas 11 to be passed though the DPF 1.

The DOC 10 is formed into a flow-through structure which comprises an oxidation-catalyst supported by a ceramic honey-comb substrate and a cell 10a both ends of which are opened. The exhaust gas 11 passes through an interior area of the cell 10a.

In the event that the temperature of the exhaust gas 12 on the DOC's upstream side detected by the DOC's upstream-side exhaust-gas temperature sensor 40 is lower than a temperature for activating the DOC, the DPF-regeneration control means 4 allows the after-injection to be executed through the injector 27 of the common-rail system 9 after the main-injection but before the post-injection or decreases the opening of the intake-air throttle to increase the temperature of the exhaust gas 12 in an attempt to activate the DOC 10.

If the temperature of the exhaust gas 13 on the DPF's downstream side detected by the DPF's downstream-side exhaust-gas temperature sensor 39 is higher than a predetermined temperature for judging abnormality, the DPF-regeneration control means 4 allows the DPF's abnormality information sending means 8 to start sending the information about the abnormality of the DPF and simultaneously to stop the post-injection or decrease the amount of the post-injection.

The DPF-regeneration means 3 may comprise either a combination of an injector for injecting the fuel into an exhaust-gas pipe with the DOC or an electric heater arranged at an inlet of the DPF.

The DPF-regeneration control means 4 is provided in the engine's ECU that is a control means 14.

The storing means 5 is a memory provided in the engine's ECU, i.e. the control means 14.

Figure 2:
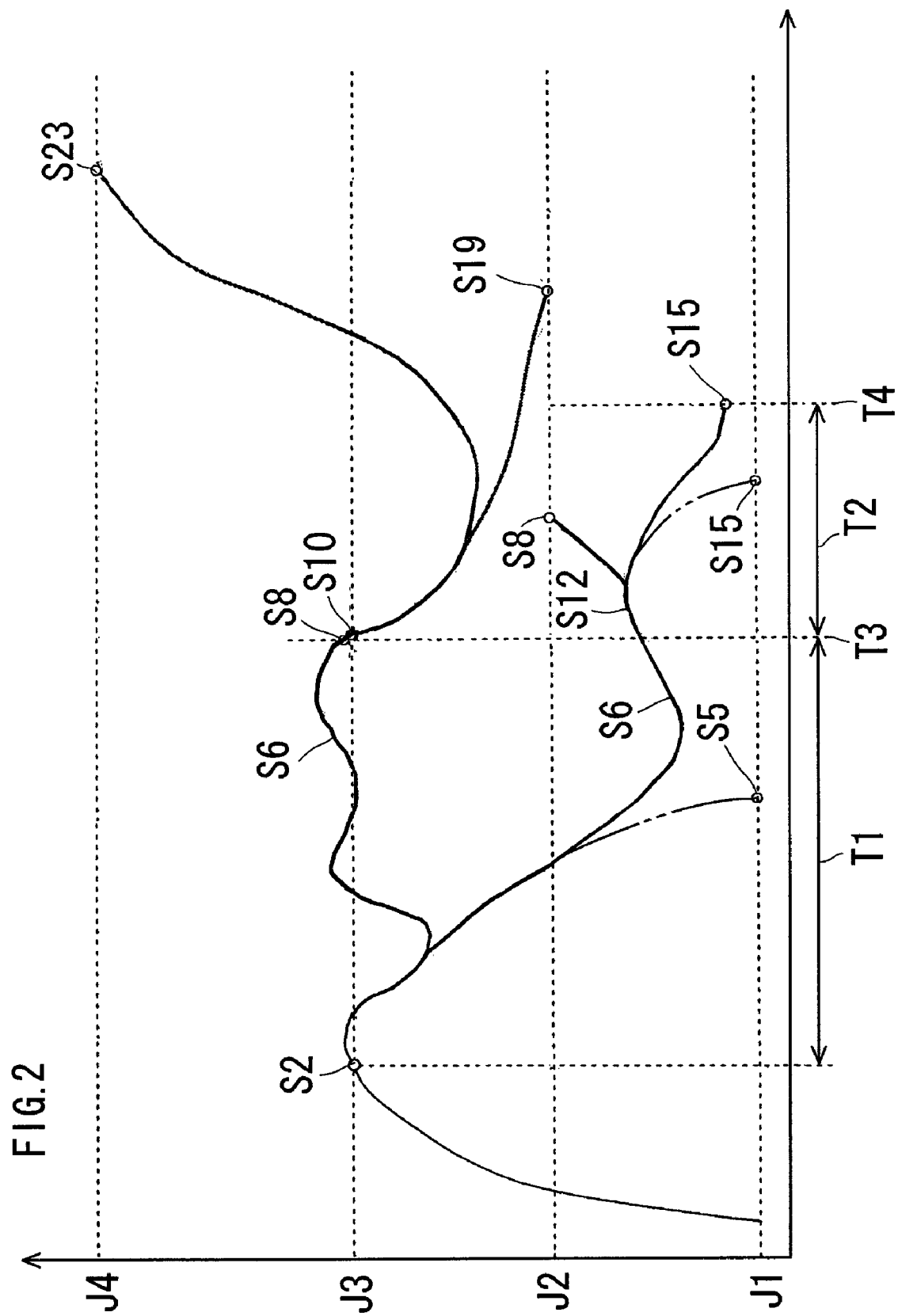
[FIG. 2] shows a time chart of a regeneration processing by the exhaust-gas processing device for the diesel engine according to the embodiment of the present invention.

The storing means 5 stores a plurality of judging values (J1), (J2) and (J3) as regards the assumed value of the PM deposited amount and a term (T1) for reserving judgment as to the demand for accelerated regeneration. As shown in FIG. 2, these plural judging values (J1), (J2) and (J3) comprise a normal-regeneration finish judging value (J1), an accelerated-regeneration demand judging value (J2) and a normal-regeneration start judging value (J3), mentioned in order from that of a lower value.

As shown in FIG. 2, the DPF-regeneration control means 4 compares the value of the PM deposited amount assumed by the PM-deposit amount presuming means 2 with the plural judging values (J1), (J2) and (J3). When the assumed value of the PM deposited amount increases to the normal-regeneration start judging value (J3), the DPF-regeneration control means 4 automatically allows the DPF-regeneration means 3 to start the normal regeneration processing (S2) so as to increase the temperature of the exhaust gas 11 to be passed through the DPF 1.

During the elapse of the term (T1) for reserving the judgment as to the demand for accelerated regeneration from the initiation of the normal regeneration processing, if the assumed value of the PM deposited amount has decreased to the normal-regeneration finish judging value (J1), the DPF-regeneration control means 4 finishes the normal regeneration processing (S5). Unless the assumed value of the PM deposited amount has decreased to the normal-regeneration finish judging value (J1), the DPF-regeneration control means 4 allows the normal regeneration processing to continue (S6). The time when the term (T1) for reserving the judgment as to the demand for accelerated regeneration has elapsed while the normal regeneration processing is being continued is taken as the time (T3) for judgment as to the demand for accelerated regeneration. At this judging time (T3), in the case where the assumed value of the PM deposited amount exceeds the value (J2) for judgment as to the demand for accelerated regeneration, the accelerated regeneration is regarded to be demanded and then the DPF-regeneration control means 4 allows the means 6 for sending message to demand the accelerated regeneration to start sending the message to demand the accelerated regeneration (S8). Once the accelerated-regeneration starting operation means 7 has performed to start the accelerated regeneration, the DPF-regeneration control means 4 allows the DPF-regeneration means 3 to switch the normal regeneration processing over to the accelerated regeneration processing (S10) so as to increase the temperature of the exhaust gas 11 to be passed through the DPF 1 and accelerate the regeneration speed of the DPF 1 more than the case of the normal regeneration processing.

The accelerated regeneration processing increases the amount to be injected by the main injection or the post-injection and the temperature of the exhaust gas 11, when compared with the case of the normal regeneration processing, so as to accelerate the regeneration speed of the DPF 1.

The means 6 for sending the message to demand the accelerated regeneration is a lamp that is provided on a dashboard of the diesel-engine loaded machine and is put on for sending the message to demand the accelerated regeneration.

The operation means 7 for starting the accelerated regeneration is an operation button provided on the dashboard which is manually pushed by an operator or the like to perform the operation for starting the accelerated regeneration.

The storing means 5 stores the term (T2) for re-judgment as to the demand for accelerated regeneration. At the above-mentioned judging time (T3), in the case where the assumed value of the PM deposited amount is lower than the judging value (J2) as to the demand for accelerated regeneration, the accelerated regeneration is regarded to be not demanded and then the DPF-regeneration control means 4 continues the normal regeneration processing (S12) even if it enters the term (T2) for re-judgment as to the demand for accelerated regeneration, in continuity with the judging time (T3) as to the demand for accelerated regeneration. In the event that the assumed value of the PM deposited amount has decreased to the normal-regeneration finish judging value (J1) during the term (T2) for re-judgment as to the demand for accelerated regeneration, the DPF-regeneration control means 4 finishes the normal regeneration processing (S15). In the case where the assumed value of the PM deposited amount has increased to the value (J2) for judgment as to the demand for accelerated regeneration, the accelerated regeneration is regarded to be demanded and then the DPF-regeneration control means 4 allows the means 6 for sending message to demand the accelerated regeneration to start sending the message to demand the accelerated regeneration (S8).

The time when the term (T2) for re-judgment as to the demand for accelerated regeneration has elapsed is taken as the time (T4) for finishing the re-judgment. At this time (T4), unless the assumed value of the PM deposited amount has not yet increased to the value (J2) for judgment as to the demand for accelerated regeneration, even if the assumed value of the PM deposited amount has not lowered to the judging value (J1) for normal-regeneration finish, the DPF-regeneration control means 4 finishes the normal regeneration processing (S15).

In the case where the DPF-regeneration control means 4 allows the DPF-regeneration means 3 to perform the accelerated regeneration processing, if the assumed value of the PM deposited amount has decreased to the value (J2) for judgment as to the demand for accelerated regeneration, which is the lower limit value of the demand for accelerated regeneration, the DPF-regeneration control means 4 finishes the accelerated regeneration processing (S19).

This exhaust-gas processing device is provided with a means 8 for sending information about an abnormality of DPF. The storing means 5, as shown in FIG. 2, stores a value (J4) for judging the abnormality of the DPF higher than the normal-regeneration starting judging value (J3). When the assumed value of the PM deposited amount increases to the judging value (J4) for abnormality of the DPF, the DPF-regeneration control means 4 allows the means 8 for sending information about the DPF's abnormality to start sending the information about the DPF's abnormality.

The means 8 for sending the information about the DPF's abnormality is a lamp that is provided on the dashboard of the diesel-engine loaded machine and is put on for sending the information about the abnormality of the DPF.

The diesel engine provided with this exhaust-gas processing device is loaded on the agricultural machine such as a combine and the construction machine such as a back-hoe. The normal regeneration processing is performed during the machine's working in which at least one of the running and working of the engine-loaded machine is done. And the accelerated regeneration processing is executed while the engine-loaded machine is not working during which both of the running and the working of the machine are interrupted.

The engine's ECU, which is the control means, performs the regeneration processing according to the following flow.

As shown in FIG. 3, Step (S1) judges whether or not the assumed value of the PM deposited amount has increased to the normal-regeneration judging value (J3). If the answer is 'No', the judgment is repeated. However if the answer is 'Yes', Step (S2) starts the normal regeneration processing.

Next, Step (S3) judges whether or not the term (T1) for reserving the judgment as to the demand for accelerated regeneration has elapsed since the normal regeneration processing has strated. If the answer is 'No', Step (S4) judges whether or not the assumed value of the PM deposited amount has decreased to the value (J1) for judgment as to finishing the normal regeneration processing. If the answer is 'Yes', Step (S5) finishes the normal regeneration processing. In the case where the judgment of Step (S4) is 'No', Step (S6) continues the normal regeneration processing and returns to Step (S3).

In the event that the judgment of Step (S3) is 'Yes', Step (S7) judges whether or not the assumed value of the deposited amount on the DPF is not less than the value (J2) for judgment as to the demand for accelerated regeneration , If the answer is 'Yes', Step (S8) starts sending the message to demand the accelerated regeneration.

Subsequently, Step (S9) judges whether or not the starting operation for accelerated regeneration is performed. If the answer is 'Yes', Step (S10) switches the normal regeneration processing over to the accelerated regeneration processing. Should the judgment of Step (S9) be 'No', Step (S11) continues the normal regeneration processing and returns to Step (S9).

If the judgment of Step (S7) is negative, Step (S12) continues the normal regeneration processing and Step (S13) judges whether or not the term (T2) for reserving the judgment as to the demand for accelerated regeneration has elapsed. If the answer is 'No', Step (S14) judges whether or not the assumed value of the PM deposited amount has decreased to the value (J1) for judgment as to finishing the normal regeneration processing. If the judgment is 'Yes', Step (S15) finishes the normal regeneration processing. In the case where the judgment of Step (S14) is negative, Step (16) judges whether or not the PM deposited amount on the DPF has increased to the judging value (J2) as to the demand for accelerated regeneration. If the judgment is 'Yes', it shifts to Step (S8). In the case where the judgment of Step (S13) is 'Yes', Step (S17) judges whether or not the assumed value of the PM deposited amount has increased to the value. (J2) for judgment as to the demand for accelerated regeneration. If the answer is 'No', even if it has not yet deceased to the value (J1) for judgment as to finishing the normal regeneration processing, Step (S15) finishes the normal regeneration processing. In the event that the judgment of Step (S17) is 'Yes', it shifts to Step (S8).

After Step (S10) has switched the normal regeneration processing over to the accelerated regeneration processing, Step (S18) judges whether or not the assumed value of the PM deposited amount has decreased to the value (J1) for judgment as to the demand for accelerated regeneration that is the lower limit value for the accelerated-regeneration demand. If the answer is 'Yes', Step (19) finishes the accelerated regeneration processing and Step (S20) completes sending the message to demand the accelerated regeneration. If the judgment of Step (S18) is 'No', Step (S21) continues the accelerated regeneration processing. Then Step (S22) judges whether or not the assumed value of the PM deposited amount has increased to the value (J4) for judging the abnormality of the DPF. If the judgment is 'Yes', Step (S23) strarts sending the information about the abnormality of the DPF. Should the judgment be 'No', it returns to Step (S18).

EXPLANATION OF REFERENCE NUMERAL (1) DPF
(2) PM deposited-amount presuming means
(3) DPF-regeneration means
(4) DPF-regeneration control means
(5) Storing means
(6) Means for sending message to demand accelerated regeneration
(7) Operation means for starting the accelerated regeneration
(8) Means for sending information about an abnormality of DPF
(9) Common-rail system
(10) DOC
(11) Exhaust gas
(J1) Value for judgment as to finishing the normal regeneration
(J2) Judging value as to the demand for accelerated regeneration
(J3) Judging value for starting the normal regeneration
(T1) Term for reserving the judgment as to the demand for accelerated regeneration
(T2) Term for re-judgment as to the demand for accelerated regeneration
(T3) Time to judge as to the demand for accelerated regeneration
(T4) Time when the re-judgment has finished

What we claim is:

1. An exhaust-gas processing device for a diesel engine loaded on a machine, the device comprising a DPF (1), a DPF regenerator (3) arranged upstream of an inlet of the DPF and having an outlet configured to pass exhaust gas to the inlet of the DPF, a controller coupled to the DPF regenerator and configured to presume an amount of PM deposited on the DPF and to control the DPF regenerator, a memory (5) coupled to the controller, an indicator light (6) mounted to the machine and coupled to the controller, and which, when activated, sends a message signaling demand for accelerated regeneration, and a user-operated actuator (7) coupled to the controller and operable to start accelerated regeneration, wherein the memory (5) stores a plurality of judging values (J2), (J3) regarding an assumed value of the PM deposited amount and a term (T1) for reserving the judgment as to the demand for accelerated regeneration;

the plurality of judging values (J2), (J3) comprises a value (J2) for judgment as to the demand for accelerated regeneration and a value (J3) for judgment as to starting the normal regeneration, higher than the judging value (J2);

the controller compares the assumed value of the PM deposited amount with the plurality of judging values (J2), (J3);

when the assumed value of the PM deposited amount has increased to the value (J3) for judgment as to starting the normal regeneration, the controller automatically enables the DPF regenerator (3) to start the normal regeneration processing (S2) so as to increase the temperature of the exhaust gas to be passed through the DPF (1);

when the normal regeneration processing is being continued (S6) since it has started (S2), the time when the term (T1) for reserving the judgment as to the demand for the accelerated regeneration has elapsed is regarded as the judging time (T3) as to the demand for accelerated regeneration, at this time (T3) for judgment as to the demand for accelerated regeneration, in the event that the assumed value of the PM deposited amount exceeds the value (J2) for judgment as to the demand for accelerated regeneration, the accelerated regeneration being deemed to be demanded and the controller allowing the indicator light (6) to start (S8) sending the message to demand the accelerated regeneration; and when the accelerated-regeneration starting operation has been performed by the user-operated actuator (7), the controller enables the DPF regenerator (3) to switch the normal regeneration processing over to the accelerated regeneration processing (S10) to increase the temperature of the exhaust gas to be passed through the DPF (1) so as to accelerate the regeneration speed of the DPF (1) more than the case of the normal regeneration processing.

2. The exhaust-gas processing device for a diesel engine according to claim 1, wherein the memory (5) stores a term (T2) for re-judgment as to the demand for accelerated regeneration, at the time (T3) for judgment as to the demand for accelerated regeneration, if the assumed value of the PM deposited amount is lower than the value (J2) for judgment as to the demand for accelerated regeneration, the accelerated regeneration being deemed to be not demanded, even if it enters the term (T2) for re-judgment as to the demand for accelerated regeneration in continuity with the time (T3) for judgment as to the demand for accelerated regeneration, the controller allowing the normal regeneration processing to continue (S12), when the assumed value of the PM deposited amount has increased to the value (J2) for judgment as to the demand for accelerated regeneration during the term (T2) for re-judgment as to the demand for accelerated regeneration, the accelerated regeneration being deemed to be demanded, the controller allowing the indicator light (6) to start (S8) sending the message to demand the accelerated regeneration, and the time when the term (T2) for re-judgment as to the demand for accelerated regeneration has elapsed is taken as the time (T4) for finishing the re-judgment, at this time (T4) for finishing the re-judgment, if the assumed value of the PM deposited amount has not yet increased to the value (J2) for judgment as to the demand for accelerated regeneration, the controller allowing the normal regeneration processing to finish (S15).

3. The exhaust-gas processing device for a diesel engine according to claim 1, wherein
when the controller allows the DPF regeneration (3) to perform the accelerated regeneration processing, when the assumed value of the PM deposited amount has decreased to the value for judgment (J2) as to the demand for accelerated regeneration, which is a lower limit value of the accelerated-regeneration demand, the controller allows the accelerated regeneration processing to finish (S19).

4. The exhaust-gas processing device for a diesel engine according to claim 1, further comprising an abnormality indicator light mounted to the machine and coupled to the controller, and which, when activated, sends information about an abnormality of the DPF, wherein
the memory (5) stores a value (J4) for judging the abnormality of the DPF, higher than the judging value (J3) for starting the normal regeneration, and
when the assumed value of the PM deposited amount has increased to the judging value (J4) as regards the abnormality of the DPF (1), the controller enables the abnormality indicator light (8) to start (S23) sending the information about the abnormality of the DPF (1).

5. The exhaust-gas processing device for a diesel engine according to claim 1, wherein
the memory (5) stores the judging value (J1) for finishing the normal regeneration, lower than the value for judgment (J2) as to the demand for accelerated regeneration, and when the normal regeneration processing has decreased the assumed value of the PM deposited amount to the judging value (J1) for finishing the normal regeneration, the controller allows the normal regeneration processing to finish (S5), (S 15).

6. The exhaust-gas processing device for a diesel engine according to claim 1, wherein
the normal regeneration processing is executed during at least either of the running and the working of the engine-loaded machine, and
the accelerated regeneration processing is effected while the machine is not working, during which both of the running and the working of the engine-loaded machine are interrupted.

7. The exhaust-gas processing device for a diesel engine according to claim 1, wherein
the DPF regenerator (3) comprises a combination of a common-rail system (9) and a DOC (10) arranged upstream of the DPF (1), and
the normal regeneration processing and the accelerated regeneration processing incorporates un-burnt fuel into the exhaust gas by a post-injection performed through an injector (27) of the common-rail system (9) after a main-injection and the un-burnt fuel makes oxidation-combustion with the oxygen in the exhaust gas by the DOC (10) so as to increase the temperature of the exhaust gas (11) to be passed though the DPF (1).

* * * * *